US012632551B2

(12) United States Patent
Falivene et al.

(10) Patent No.: US 12,632,551 B2
(45) Date of Patent: May 19, 2026

(54) IDENTIFYING COMMAND AND CONTROL ATTACKS USING API CALLS

(71) Applicant: Dropbox, Inc., San Francisco, CA (US)

(72) Inventors: Jason Falivene, Kingston, WA (US);
Ivo Ivanov, Kenmore, WA (US);
Carlos Fuentes Bermejo, Dublin (IE)

(73) Assignee: Dropbox, Inc., San Francisco, CA (US)

( * ) Notice: Subject to any disclaimer, the term of this patent is extended or adjusted under 35 U.S.C. 154(b) by 201 days.

(21) Appl. No.: 18/224,451

(22) Filed: Jul. 20, 2023

(65) Prior Publication Data

US 2025/0028829 A1     Jan. 23, 2025

(51) Int. Cl.
*G06F 21/56*     (2013.01)
*G06F 9/54*     (2006.01)

(52) U.S. Cl.
CPC .............. *G06F 21/566* (2013.01); *G06F 9/54* (2013.01); *G06F 2221/033* (2013.01)

(58) Field of Classification Search
CPC ......................... G06F 21/566; G06F 2221/033
See application file for complete search history.

(56) References Cited

U.S. PATENT DOCUMENTS

| | | | | |
|---|---|---|---|---|
| 11,146,572 B2 | 10/2021 | Gupta et al. | | |
| 11,556,653 B1 | 1/2023 | Han et al. | | |
| 2019/0294791 A1* | 9/2019 | Saldanha | .............. | G06F 21/554 |
| 2021/0029157 A1* | 1/2021 | Manoselvam | ........ | H04L 63/101 |
| 2021/0141897 A1 | 5/2021 | Seifert et al. | | |
| 2021/0166331 A1 | 6/2021 | Buglak et al. | | |
| 2022/0067146 A1 | 3/2022 | Cai et al. | | |

| | | | | |
|---|---|---|---|---|
| 2022/0164447 A1* | 5/2022 | Yi | .......................... | G06F 21/566 |
| 2023/0075094 A1* | 3/2023 | Xu | .......................... | G06N 20/00 |
| 2023/0409714 A1* | 12/2023 | Chen | ........................ | G06N 5/01 |
| 2024/0362330 A1* | 10/2024 | Vigna | ................. | G06N 3/0464 |
| 2025/0007848 A1* | 1/2025 | Neupane | ............. | H04L 47/2441 |
| 2025/0007930 A1* | 1/2025 | Feng | .................. | H04L 63/1425 |

FOREIGN PATENT DOCUMENTS

| | | | |
|---|---|---|---|
| CN | 108595953 | B | 5/2020 |
| CN | 113094709 | A | 7/2021 |
| CN | 113901465 | A | 1/2022 |
| CN | 110213200 | B | 7/2022 |
| CN | 115730310 | A | 3/2023 |
| KR | 20210089849 | A | 7/2021 |
| KR | 102392559 | B1 | 4/2022 |

OTHER PUBLICATIONS

Hua-Dong Liu, et al., "System Upgrading Method, Terminal, Server and Upgrading System", Jul. 9, 2014, CN103916468 (WIPO English Translation), pp. 1-10. (Year: 2014) (Year: 2014).*

* cited by examiner

*Primary Examiner* — Jonathan A Bui

(74) *Attorney, Agent, or Firm* — Keller Preece PLLC

(57)     ABSTRACT

A collaborative content management system identifies an application installed on one or more client devices that is susceptible to an attack by using the API calls of the application. The collaborative content management system obtains API calls made by the application and derives API call features. The collaborative content management system inputs the API call features into a machine learning model and receives, as output from the model, a determination of whether the set of API calls represents a C2 attack. In some embodiments, the collaborative content management system, responsive to determining that the set of API calls represents a C2 attack, may take a security action.

18 Claims, 7 Drawing Sheets

500

Identify application susceptible to attack
510

Obtain set of API calls made by application
520

Extract API call features from set of API calls
530

Input vector of risk signals into machine learning model
540

Receive determination as to whether API calls represent command and control attack
550

500

IDENTIFYING COMMAND AND CONTROL ATTACKS USING API CALLS

TECHNICAL FIELD

The disclosed embodiments generally relate to the detection and prevention of malware command and control and more particularly relate to identifying malware command and control using API calls.

BACKGROUND

Existing application programming interface (API) security methods focus on preventing threat actors from accessing and changing the functionality of an API, often relying on authentication techniques to do so. However, these methods fail to consider the cases in which threat actors with legitimate access to an API use the API in the way it is designed to perform malicious acts. For example, a threat actor may use an API to perform command and control (C2) of malware in which the threat actor uses the API as a channel through which they can communicate with and control a target device.

SUMMARY

In the proposed approach, a collaborative content management system uses a machine learning model to identify patterns in API usage that correspond with malicious activity. The collaborative content management system identifies an application that uses API calls to interact with content items, for example making API calls to upload or download files. From the API calls made by the application, the collaborative content management system extracts API call features. Example API call features may be timestamps of API requests (e.g., timestamp of an API request to download a file), frequency of requests, or pattern of requests (e.g., an API request to create a file followed by an API request to modify a file), among other features. The collaborative content management system inputs the API call features extracted from the API calls of the application into a machine learning model, which outputs whether the API calls of the application represent malware command and control. If the API calls represent malware command and control, the collaborative content management system may take a security action, for example adding the application to a deny list.

In an embodiment, a collaborative content management system identifies an application installed on one or more client devices that is susceptible to an attack by using the API calls of the application. The collaborative content management system obtains API calls made by the application and derives API call features. The collaborative content management system inputs the API call features into a machine learning model and receives, as output from the model, a determination of whether the set of API calls represents a malware C2. In some embodiments, the collaborative content management system, responsive to determining that the set of API calls represents malware C2, may take a security action.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

System Overview

Figure 1:
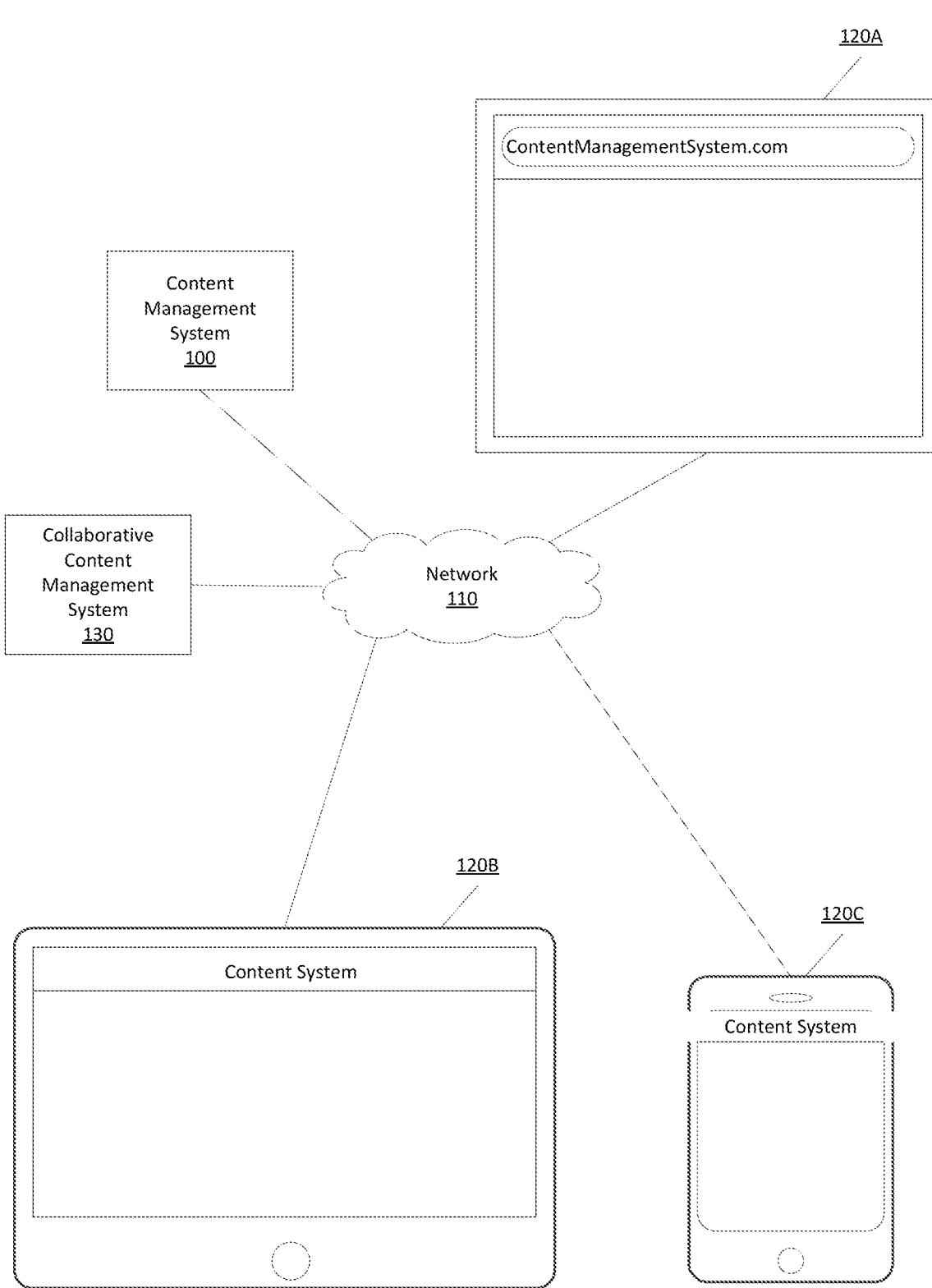
FIG. 1 shows a diagram of a system environment of a content management system and a collaborative content management system according to one embodiment.

FIG. 1 shows a system environment including content management system 100, collaborative content management system 130, and client devices 120a, 120b, and 120c (collectively or individually "120"). Content management system 100 provides functionality for sharing content items with one or more client devices 120 and synchronizing content items between content management system 100 and one or more client devices 120.

The content stored by content management system 100 can include any type of content items, such as documents, spreadsheets, collaborative content items, text files, audio files, image files, video files, webpages, executable files, binary files, placeholder files that reference other content items, etc. In some implementations, a content item can be a portion of another content item, such as an image that is included in a document. Content items can also include collections, such as folders, namespaces, playlists, albums, etc., that group other content items together. The content stored by content management system 100 may be organized in one configuration in folders, tables, or in other database structures (e.g., object oriented, key/value etc.).

In one embodiment, the content stored by content management system 100 includes content items created by using third party applications, e.g., word processors, video and image editors, database management systems, spreadsheet applications, code editors, and so forth, which are independent of content management system 100.

In some embodiments, content stored by content management system 100 includes content items, e.g., collaborative content items, created using a collaborative interface provided by collaborative content management system 130. In various implementations, collaborative content items can be stored by collaborative content management system 130, with content management system 100, or external to content management system 100. A collaborative interface can provide an interactive content item collaborative platform whereby multiple users can simultaneously create and edit collaborative content items, comment in the collaborative content items, and manage tasks within the collaborative content items.

Users may create accounts at content management system 100 and store content thereon by sending such content from client device 120 to content management system 100. The content can be provided by users and associated with user accounts that may have various privileges. For example, privileges can include permissions to see content item titles, see other metadata for the content item (e.g. location data, access history, version history, creation/modification dates, comments, file hierarchies, etc.), read content item contents, modify content item metadata, modify content of a content item, comment on a content item, read comments by others on a content item, or grant or remove content item permissions for other users.

Client devices 120 communicate with content management system 100 and collaborative content management system 130 through network 110. The network may be any suitable communications network for data transmission. In one embodiment, network 110 is the Internet and uses standard communications technologies and/or protocols. Thus, network 110 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), JavaScript Object Notation (JSON), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

In some embodiments, content management system 100 and collaborative content management system 130 are combined into a single system. The system may include one or more servers configured to provide the functionality discussed herein for the systems 100 and 130.

Client Device

Figure 2:
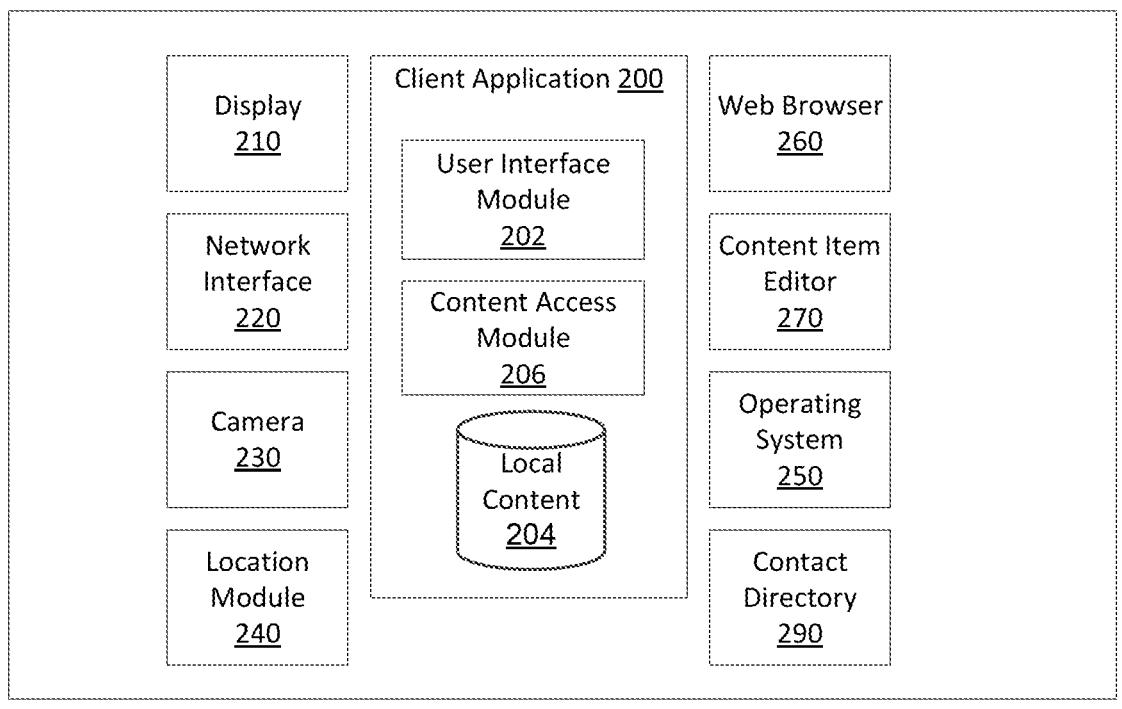
FIG. 2 shows a block diagram of components of a client device, according to one example embodiment.

FIG. 2 shows a block diagram of the components of a client device 120 according to one embodiment. Client devices 120 generally include devices and modules for communicating with content management system 100 and a user of client device 120. Client device 120 includes display 210 for providing information to the user, and in certain client devices 120 includes a touchscreen. Client device 120 also includes network interface 220 for communicating with content management system 100 via network 110. There are additional components that may be included in client device 120 but that are not shown, for example, one or more computer processors, local fixed memory (RAM and ROM), as well as optionally removable memory (e.g., SD-card), power sources, and audio-video outputs.

In certain embodiments, client device 120 includes additional components such as camera 230 and location module 240. Location module 240 determines the location of client device 120, using, for example, a global positioning satellite signal, cellular tower triangulation, or other methods. Location module 240 may be used by client application 200 to obtain location data and add the location data to metadata about a content item.

Client devices 120 maintain various types of components and modules for operating the client device and accessing content management system 100. The software modules can include operating system 250 or a collaborative content item editor 270. Collaborative content item editor 270 is configured for creating, viewing and modifying collaborative content items such as text documents, code files, mixed media files (e.g., text and graphics), presentations or the like. Operating system 250 on each device provides a local file management system and executes the various software modules such as client application 200 and collaborative content item editor 270. A contact directory 290 stores information on the user's contacts, such as name, telephone numbers, company, email addresses, physical address, website URLs, and the like.

Client devices 120 access content management system 100 and collaborative content management system 130 in a variety of ways. Client device 120 may access these systems through a native application or software module, such as client application 200. Client device 120 may also access content management system 100 through web browser 260. As an alternative, the client application 200 may integrate access to content management system 100 with the local file management system provided by operating system 250. When access to content management system 100 is integrated in the local file management system, a file organization scheme maintained at the content management system is represented at the client device 120 as a local file structure by operating system 250 in conjunction with client application 200. In some embodiments, client devices 120 may access content management system 100 and collaborative content management system 130 via an Application Programming Interface (API). For example, the client application 200 may interact with the content management system 100 and collaborative content management system 130 by making API calls including instructions to upload, download, or modify a content item.

Client application 200 manages access to content management system 100 and collaborative content management system 130. Client application 200 includes user interface module 202 that generates an interface to the content accessed by client application 200 and is one means for performing this function. The generated interface is provided to the user by display 210. Client application 200 may store content accessed from a content storage at content management system 100 in local content 204. While represented here as within client application 200, local content 204 may be stored with other data for client device 120 in non-volatile storage. When local content 204 is stored this way, the content is available to the user and other applications or modules, such as collaborative content item editor 270, when client application 200 is not in communication with content management system 100. Content access module 206 manages updates to local content 204 and communicates with content management system 100 to synchronize content modified by client device 120 with content maintained on content management system 100, and is one means for performing this function. Client application 200 may take various forms, such as a stand-alone application, an application plugin, or a browser extension.

Content Management System

Figure 3:
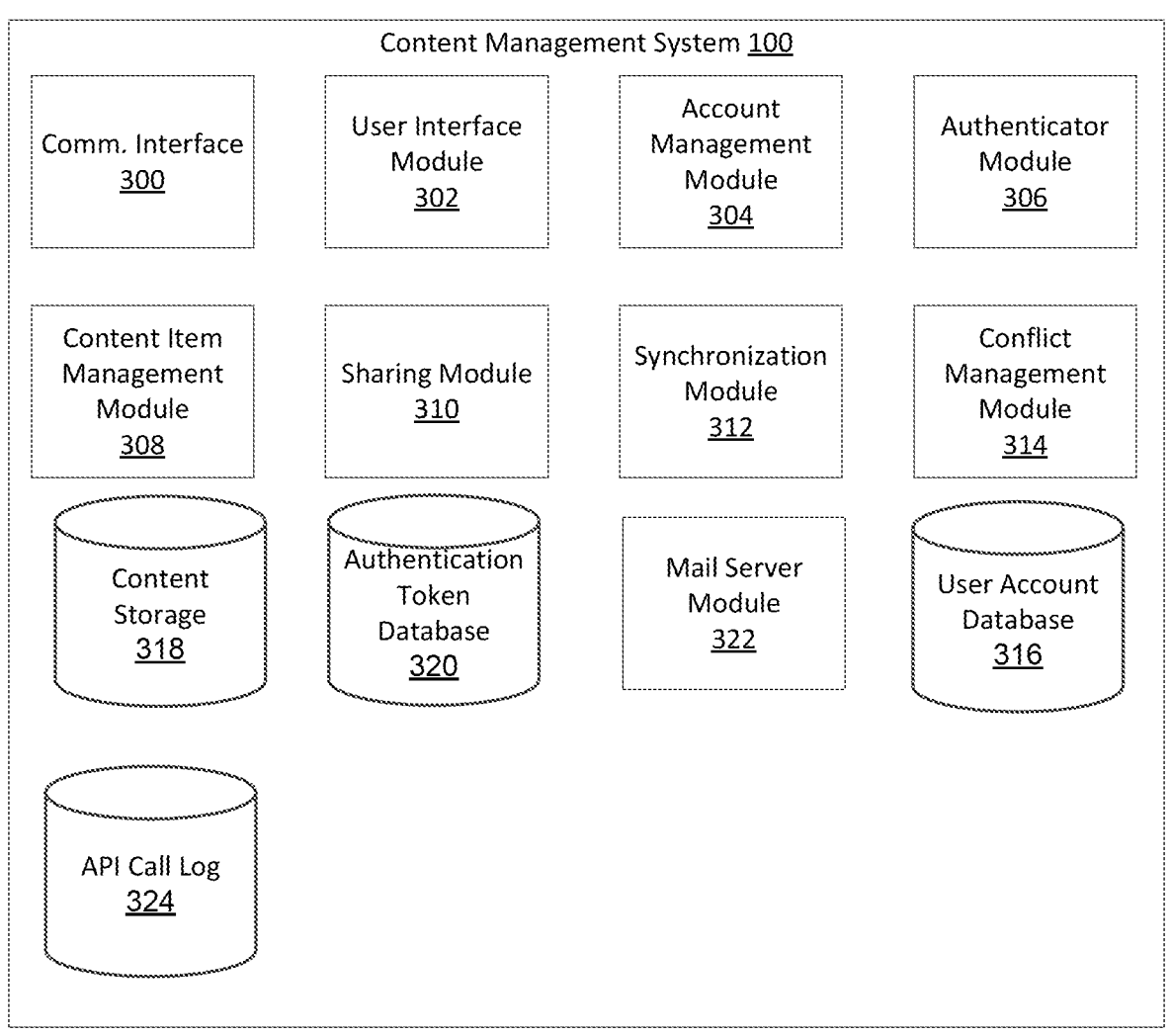
FIG. 3 shows a block diagram of a content management system, according to one example embodiment.

FIG. 3 shows a block diagram of the content management system 100 according to one embodiment. To facilitate the various content management services, a user can create an account with content management system 100. The account information can be maintained in user account database 316, and is one means for performing this function. User account database 316 can store profile information for registered users. In some cases, the only personal information in the user profile is a user name and/or email address. However, content management system 100 can also be configured to accept additional user information, such as password recovery information, demographics information, payment information, and other details. Each user is associated with a userID and a user name. For purposes of convenience, references herein to information such as collaborative content items or other data being "associated" with a user are understood to mean an association between a collaborative content item and either of the above forms of user identifier for the user. Similarly, data processing operations on collaborative content items and users are understood to be operations performed on derivative identifiers such as collaborativeContentItemID and userIDs. For example, a user may be associated with a collaborative content item by storing the information linking the userID and the collaborativeContentItemID in a table, file, or other storage formats. For example, a database table organized by collaborativeContentItemIDs can include a column listing the userID of each user associated with the collaborative content item. As another example, for each userID, a file can list a set of collaborativeContentItemID associated with the user. As another example, a single file can list key values pairs such as <userID, collaborativeContentItemID> representing the association between an individual user and a collaborative content item. The same types of mechanisms can be used to associate users with comments, threads, text elements, formatting attributes, and the like.

User account database 316 can also include account management information, such as account type, e.g. free or paid; usage information for each user, e.g., file usage history; maximum storage space authorized; storage space used; content storage locations; security settings; personal configuration settings; content sharing data; etc. Account management module 304 can be configured to update and/or obtain user account details in user account database 316. Account management module 304 can be configured to interact with any number of other modules in content management system 100.

An account can be used to store content items, such as collaborative content items, audio files, video files, etc., from one or more client devices associated with the account. Content items can be shared with multiple users and/or user accounts. In some implementations, sharing a content item can include associating, using sharing module 310, the content item with two or more user accounts and providing for user permissions so that a user that has authenticated into one of the associated user accounts has a specified level of access to the content item. That is, the content items can be shared across multiple client devices of varying type, capabilities, operating systems, etc. The content items can also be shared across varying types of user accounts.

Individual users can be assigned different access privileges to a content item shared with them, as discussed above. In some cases, a user's permissions for a content item can be explicitly set for that user. A user's permissions can also be set based on: a type or category associated with the user (e.g., elevated permissions for administrator users or manager), the user's inclusion in a group or being identified as part of an organization (e.g., specified permissions for all members of a particular team), and/or a mechanism or context of a user's accesses to a content item (e.g., different permissions based on where the user is, what network the user is on, what type of program or API the user is accessing, whether the user clicked a link to the content item, etc.). Additionally, permissions can be set by default for users, user types/groups, or for various access mechanisms and contexts.

In some implementations, shared content items can be accessible to a recipient user without requiring authentication into a user account. This can include sharing module 310 providing access to a content item through activation of a link associated with the content item or providing access through a globally accessible shared folder.

The content can be stored in content storage 318, which is one means for performing this function. Content storage 318 can be a storage device, multiple storage devices, or a server. Alternatively, content storage 318 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

Content storage 318 can decrease the amount of storage space required by identifying duplicate files or duplicate segments of files. Instead of storing multiple copies of an identical content item, content storage 318 can store a single copy and then use a pointer or other mechanism to link the duplicates to the single copy. Similarly, content storage 318 stores files using a file version control mechanism that tracks changes to files, different versions of files (such as a diverging version tree), and a change history. The change history can include a set of changes that, when applied to the original file version, produces the changed file version.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later-submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API), which is one means for performing this function. Certain software applications (e.g., an app on a smartphone or tablet computing device, client application 200) may access content storage 318 via an API on behalf of a user. A software application may programmatically make API calls directly to content management system 100 that include instructions on how to interact with content storage 318 or stored the content items. For example, client application 200 may make an API call including instructions to upload a content item to content storage 318 or to download a content item from storage 318. Similarly, the API can allow users to access all or part of content storage 318 through a web site. In some embodiments, the content management system 100 may restrict access to the API, such that software applications may only interface via the API when a user provides credentials to read, write, create, delete, share, or otherwise manipulate content.

Content management system 100 may store API calls in API call log 324. For each stored API call, API call log 324 includes information relevant to the API call. Information may include but is not limited to a timestamp of the API request, a status code (e.g., an HTTP status code), a unique ID for the API request, an API request method (e.g., GET, PUT, POST, DELETE, PATH, MERGE), a request URI (which may include a request URL), a source IP address, a source application, security information (e.g., authentication information, credentials), a response payload, a response size, a response time, error logs, and debug logs.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. After receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid or delete the matching authentication token from authentication token database 320.

In some embodiments, content management system 100 includes a content management module 308 for maintaining a content directory that identifies the location of each content item in content storage 318, and allows client applications to request access to content items in the storage 318, and which is one means for performing this function. A content entry in the content directory can also include a content pointer that identifies the location of the content item in content storage 318. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes user account identifier that identifies the user account that has access to the content item. In some embodiments, multiple user account identifiers can be associated with a single content entry indicating that the content item has shared access by the multiple user accounts.

In some embodiments, the content management system 100 can include a mail server module 322. The mail server module 322 can send (and receive) collaborative content items to (and from) other client devices using the collaborative content management system 130. The mail server module can also be used to send and receive messages between users in the content management system.

Collaborative Content Management System

Figure 4:
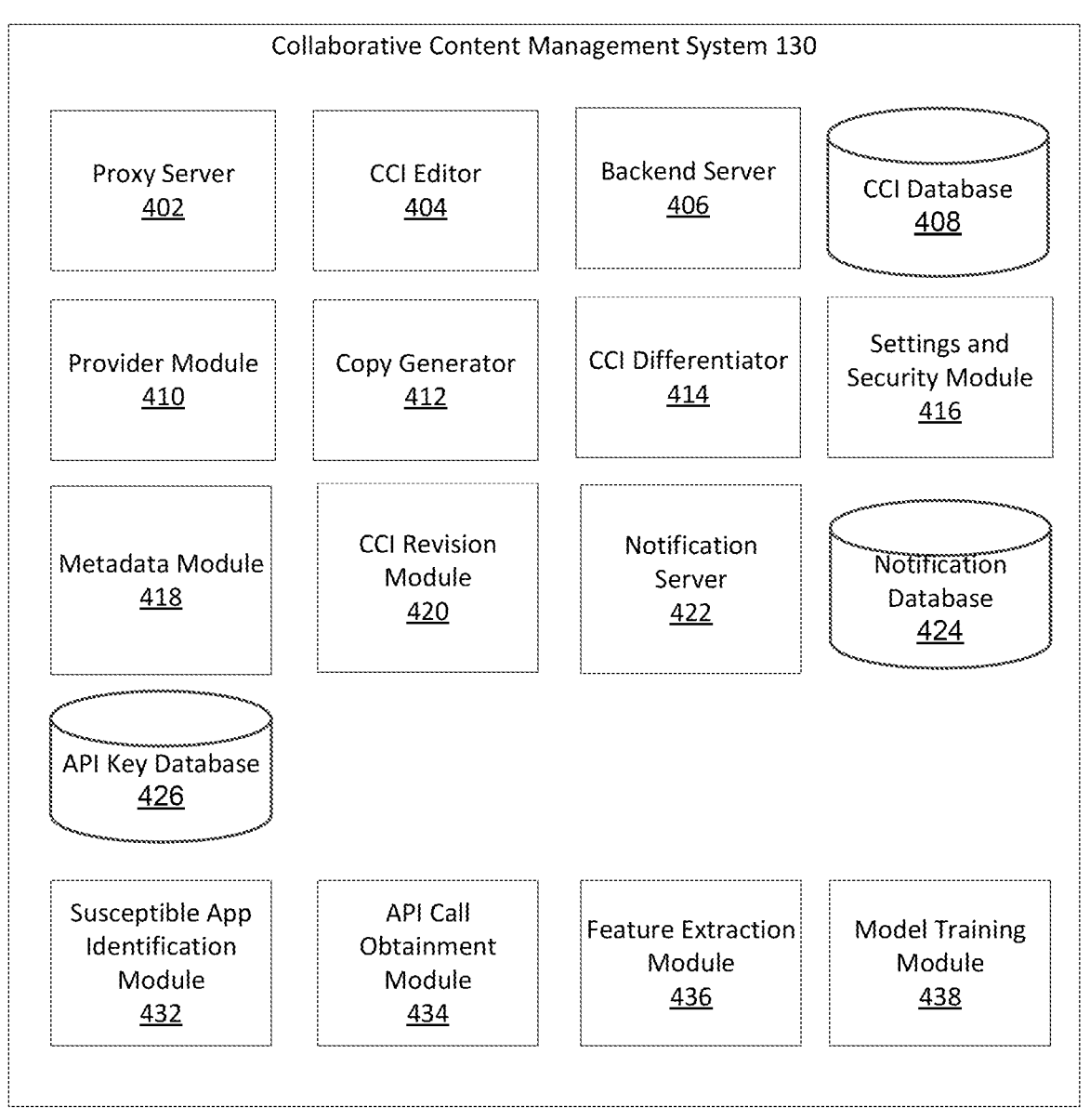
FIG. 4 shows a block diagram of a collaborative content management system, according to one example embodiment.

FIG. 4 shows a block diagram of the collaborative content management system 130, according to one embodiment. Collaborative content items can be files that users can create and edit using a collaborative content items editor 270 and can contain collaborative content item elements. Collaborative content item elements may include any type of content such as text; images, animations, videos, audio, or other multi-media; tables; lists; references to external content; programming code; tasks; tags or labels; comments; or any other type of content. Collaborative content item elements can be associated with an author identifier, attributes, interaction information, comments, sharing users, etc. Collaborative content item elements can be stored as database entities, which allows for searching and retrieving the collaborative content items. As with other types of content items, collaborative content items may be shared and synchronized with multiple users and client devices 120, using sharing 310 and synchronization 312 modules of content management system 100. Users operate client devices 120 to create and edit collaborative content items, and to share collaborative content items with other users of client devices 120. Changes to a collaborative content item by one client device 120 are propagated to other client devices 120 of users associated with that collaborative content item.

In the embodiment of FIG. 1, collaborative content management system 130 is shown as separate from content management system 100 and can communicate with it to obtain its services. In other embodiments, collaborative content management system 130 is a subsystem of the component of content management system 100 that provides sharing and collaborative services for various types of content items. User account database 316 and authentication token database 320 from content management system 100 are used for accessing collaborative content management system 130 described herein.

Collaborative content management system 130 can include various servers for managing access and edits to collaborative content items and for managing notifications about certain changes made to collaborative content items. Collaborative content management system 130 can include proxy server 402, collaborative content item editor 404, backend server 406, and collaborative content item database 408, access module 410, copy generator 412, collaborative content item differentiator 414, settings and security module 416, metadata module 418, revision module 420, notification server 422, notification database 424, susceptible app identification module 432, API call obtainment module 434, feature extraction module 436, and model training module 438. Proxy server 402 handles requests from client applications 200 and passes those requests to the collaborative content item editor 404. Collaborative content item editor 404 manages application level requests for client applications 200 for editing and creating collaborative content items, and selectively interacts with backend servers 406 for processing lower level processing tasks on collaborative content items, and interfacing with collaborative content items database 408 as needed. Collaborative content items database 408 contains a plurality of database objects representing collaborative content items, comment threads, and comments. Each of the database objects can be associated with a content pointer indicating the location of each object within the CCI database 408. Notification server 422 detects actions performed on collaborative content items that trigger notifications, creates notifications in notification database 424, and sends notifications to client devices.

Client application 200 sends a request relating to a collaborative content item to proxy server 402. Generally, a request indicates the userID ("UID") of the user, and the collaborativeContentItemID ("NID") of the collaborative content item, and additional contextual information as appropriate, such as the text of the collaborative content item. When proxy server 402 receives the request, the proxy server 402 passes the request to the collaborative content item editor 404. Proxy server 402 also returns a reference to the identified collaborative content items proxy server 402 to client application 200, so the client application can directly communicate with the collaborative content item editor 404 for future requests. In an alternative embodiment, client application 200 initially communicates directly with a specific collaborative content item editor 404 assigned to the userID.

When collaborative content item editor 404 receives a request, it determines whether the request can be executed directly or by a backend server 406. When the request adds, edits, or otherwise modifies a collaborative content item the request is handled by the collaborative content item editor 404. If the request is directed to a database or index inquiry, the request is executed by a backend server 406. For example, a request from client device 120 to view a collaborative content item or obtain a list of collaborative content items responsive to a search term is processed by backend server 406.

The access module 410 receives a request to provide a collaborative content item to a client device. In one embodiment, the access module generates an access link to the collaborative content item, for instance in response to a request to share the collaborative content item by an author.

The access link can be a hyperlink including or associated with the identification information of the CCI (i.e., unique identifier, content pointer, etc.). The hyperlink can also include any type of relevant metadata within the content management system (i.e., author, recipient, time created, etc.). In one embodiment, the access module can also provide the access link to user accounts via the network 110, while in other embodiments the access link can be provided or made accessible to a user account and is accessed through a user account via the client device. In one embodiment, the access link will be a hyperlink to a landing page (e.g., a webpage, a digital store front, an application login, etc.) and activating the hyperlink opens the landing page on a client device. The landing page can allow client devices not associated with a user account to create a user account and access the collaborative content item using the identification information associated with the access link. Additionally, the access link module can insert metadata into the collaborative content item, associate metadata with the collaborative content item, or access metadata associated with the collaborative content item that is requested.

The access module 410 can also provide collaborative content items via other methods. For example, the access module 410 can directly send a collaborative content item to a client device or user account, store a collaborative content item in a database accessible to the client device, interact with any module of the collaborative content management system to provide modified versions of collaborative content items (e.g., the copy generator 412, the CCI differentiator 414, etc.), sending content pointer associated with the collaborative content item, sending metadata associated with the collaborative content item, or any other method of providing collaborative content items between devices in the network. The access module can also provide collaborative content items via a search of the collaborative content item database (i.e., search by a keyword associated with the collaborative content item, the title, or a metadata tag, etc.).

The copy generator 412 can duplicate a collaborative content item. Generally, the copy generator duplicates a collaborative content item when a client device selects an access link associated with the collaborative content item. The copy generator 412 accesses the collaborative content item associated with the access link and creates a derivative copy of the collaborative content item for every request received. The copy generator 412 stores each derivative copy of the collaborative content item in the collaborative content item database 408. Generally, each copy of the collaborative content item that is generated by the copy generator 412 is associated with both the client device from which the request was received and the user account associated with the client device requesting the copy. When the copy of the collaborative content item is generated, it can create a new unique identifier and content pointer for the copy of the collaborative content item. Additionally, the copy generator 412 can insert metadata into the collaborative content item, associate metadata with the copied collaborative content item, or access metadata associated with the collaborative content item that was requested to be copied.

The collaborative content item differentiator 414 determines the difference between two collaborative content items. In one embodiment, the collaborative content item differentiator 414 determines the difference between two collaborative content items when a client device selects an access hyperlink and accesses a collaborative content item that the client device has previously used the copy generator 412 to create a derivative copy. The content item differentiator can indicate the differences between the content elements of the compared collaborative content items. The collaborative content item differentiator 414 can create a collaborative content item that includes the differences between the two collaborative content items, i.e., a differential collaborative content item. In some embodiments, the collaborative content item differentiator provides the differential collaborative content item to a requesting client device 120. The differentiator 414 can store the differential collaborative content item in the collaborative content item database 408 and generate identification information for the differential collaborative content item. Additionally, the differentiator 414 can insert metadata into the accessed and created collaborative content items, associate metadata with the accessed and created collaborative content item, or access metadata associated with the collaborative content items that were requested to be differentiated.

The metadata module 418 manages metadata within with the collaborative content management system. Generally, metadata can take three forms within the collaborative content management system: internal metadata, external metadata, and device metadata. Internal metadata is metadata within a collaborative content item, external metadata is metadata associated with a CCI but not included or stored within the CCI itself, and device metadata is associated with client devices. At any point, the metadata module can manage metadata by changing, adding, or removing metadata.

Some examples of internal metadata can be: identifying information within collaborative content items (e.g., email addresses, names, addresses, phone numbers, social security numbers, account or credit card numbers, etc.); metadata associated with content elements (e.g., location, time created, content element type; content element size; content element duration, etc.); comments associated with content elements (e.g., a comment giving the definition of a word in a collaborative content item and its attribution to the user account that made the comment); or any other metadata that can be contained within a collaborative content item.

Some examples of external metadata can be: content tags indicating categories for the metadata; user accounts associated with a CCI (e.g., author user account, editing user account, accessing user account etc.); historical information (e.g., previous versions, access times, edit times, author times, etc.); security settings; identifying information (e.g., unique identifier, content pointer); collaborative content management system 130 settings; user account settings; or any other metadata that can be associated with the collaborative content item.

Some examples of device metadata can be: device type; device connectivity; device size; device functionality; device sound and display settings; device location; user accounts associated with the device; device security settings; or any other type of metadata that can be associated with a client device 120.

The collaborative content item revision module 420 manages application level requests for client applications 200 for revising differential collaborative content items and selectively interacts with backend servers 406 for processing lower level processing tasks on collaborative content items, and interfacing with collaborative content items database 408 as needed. The revision module can create a revised collaborative content item that is some combination of the content elements from the differential collaborative content item. The revision module 420 can store the revised collaborative content item in the collaborative content item database or provide the revised collaborative content item to a client device 120. Additionally, the revision module 420 can insert metadata into the accessed and created collaborative content items, associate metadata with the accessed and created collaborative content item, or access metadata associated with the collaborative content items that were requested to be differentiated.

The susceptible app identification module 432 identifies an application that is susceptible to belonging to a command and control (C2) infrastructure. Command and control (C2) is a technique or process by which a threat actor uses one or more communication channels to deliver instructions to a compromised device. As follows, C2 infrastructure is the infrastructure that enables such a technique or process, herein referred to as a "C2 attack," to be executed. To initiate a C2 attack, a threat actor infects a target device with malware. Common techniques for infecting a target device with malware include sending malware in an email attachment that, upon opening, executes malicious code, directing a user of the target device, through a link, to a malicious website, installing malware through an insecure web browser plugin, or installing malware via other infected software that the user of the target device may download. Once infected with malware, the target device is "compromised." The threat actor may then establish a communication channel between a device operated by the threat actor, a "control device" and the malware on the compromised device. The control device may use the communication channel to deliver instructions to the compromised device, and likewise the compromised device may use the communication channel to transmit a response. In some embodiments, a threat actor may use C2 infrastructure to perform other types of attack in which the control device extracts data from the compromised device or causes the compromised device to perform additional actions such as downloading additional malware or creating a botnet, a network of compromised devices.

Returning to the discussion of C2 infrastructure, in some embodiments, C2 infrastructure may include an application and an API associated with the content management system 100. The application may be a client application 200 on a client device 120. The application is a "susceptible application" because it belongs to the C2 infrastructure. In an example, to use the described C2 infrastructure for a C2 attack, a threat actor first creates a susceptible application that has access to the API associated with the content management system 100. The content management system 100 provides the susceptible application with an API key, which the content management system 100 may use to identify or authenticate the application. The threat actor sets up one or more accounts with the susceptible application, each account allowing access to the susceptible application (e.g., client application 200) through a device (e.g., client device 120). In one example, a threat actor may access the susceptible application through a control device. In another example, through a set of code or instructions, malware may access the susceptible application through a compromised device.

Figure 7:
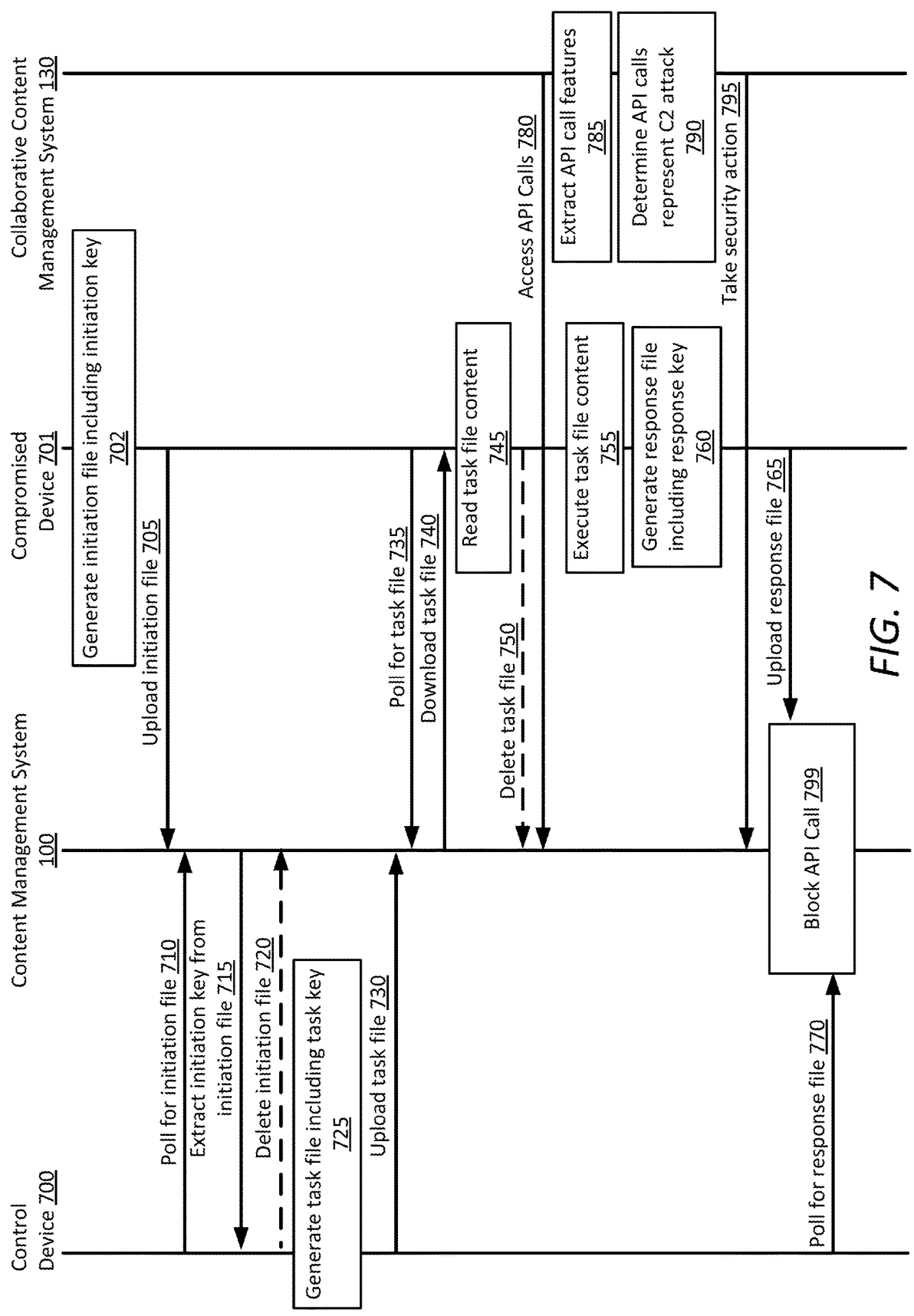
FIG. 7 shows an example of malware C2 performed using API calls to a content management system, according to one example embodiment.

As explained with respect to FIG. 3, a client application 200 may use the API associated with the content management system 100 to interface with the communications interface 300 of the content management system 100, access content storage 318 of the content management system 100, or programmatically make calls directly to the content management system 100. As such, the susceptible application may, through API calls to the content management system 100, interact with collaborative content items. For example, the susceptible application may create a collaborative content item, download a collaborative content item, delete a collaborative content item, etc. To perform a C2 attack, a threat actor need only to use the susceptible application and API calls as a communication channel between a control device and a compromised device. For example, a control device may deliver instructions to a compromised device by having the susceptible application on the control device make an API call to upload a file to the content management system 100, the file including instructions for the malware on the compromised device. The susceptible application on the compromised device may then download the collaborative content item from the content management system 100, execute the instructions, and, through an API call, upload a new file to the content management system 100, the new file including the response or results from the executed instructions. An example C2 attack using C2 infrastructure is shown in FIG. 7.

Not all susceptible applications use the C2 infrastructure to perform attacks. Susceptible applications may use API calls in benign ways, for example to upload an organization's content items to a place where others in their organization can access, view, or edit those items. API calls made by a susceptible application in a C2 attack may, at a high level, appear no different than API calls made by a susceptible application that is not performing a C2 attack. Further, threat actors may take extra precautions to obscure or disguise activity associated with C2 attacks. For example, a threat actor may blend network traffic of a C2 attack with other types of legitimate network traffic, such as hypertext transfer protocol secure (HTTP/s) or domain name system (DNS) traffic. In another example, a threat actor may encode or encrypt C2 instructions. Moreover, executing a C2 attack does not require the susceptible application to change the way the API is designed or access unauthorized content. Though the authenticator module 306 may monitor and verify API calls, because the API calls used in a C2 attack appear no different than benign calls, the C2 attack may easily evade the detection of the authenticator module 306.

The susceptible app identification module 432 may identify the susceptible application from a set of applications that have access to the API. For example, the susceptible app identification module 432 may identify the susceptible application from a set of applications with associated API keys (stored in the API key database 426). In another embodiment, the susceptible app identification module 432 may identify the susceptible application from a set of applications for which API activity was logged (e.g., in API call log 324), either over all time or over a particular time range (e.g., one year).

In some embodiments, the susceptible app identification module 432 may identify the susceptible application from a set of applications in a development state, where an application in a development state is an application that uses the API and has not been approved or verified by the collaborative content management system 130. The susceptible app identification module 432 may alternatively or additionally identify the susceptible application from a set of applications that excludes applications in a production state, where an application in a production state is an application that has been reviewed and approved by the collaborative content management system 130 or is publicly associated with the collaborative content management system 130.

Figure 6:
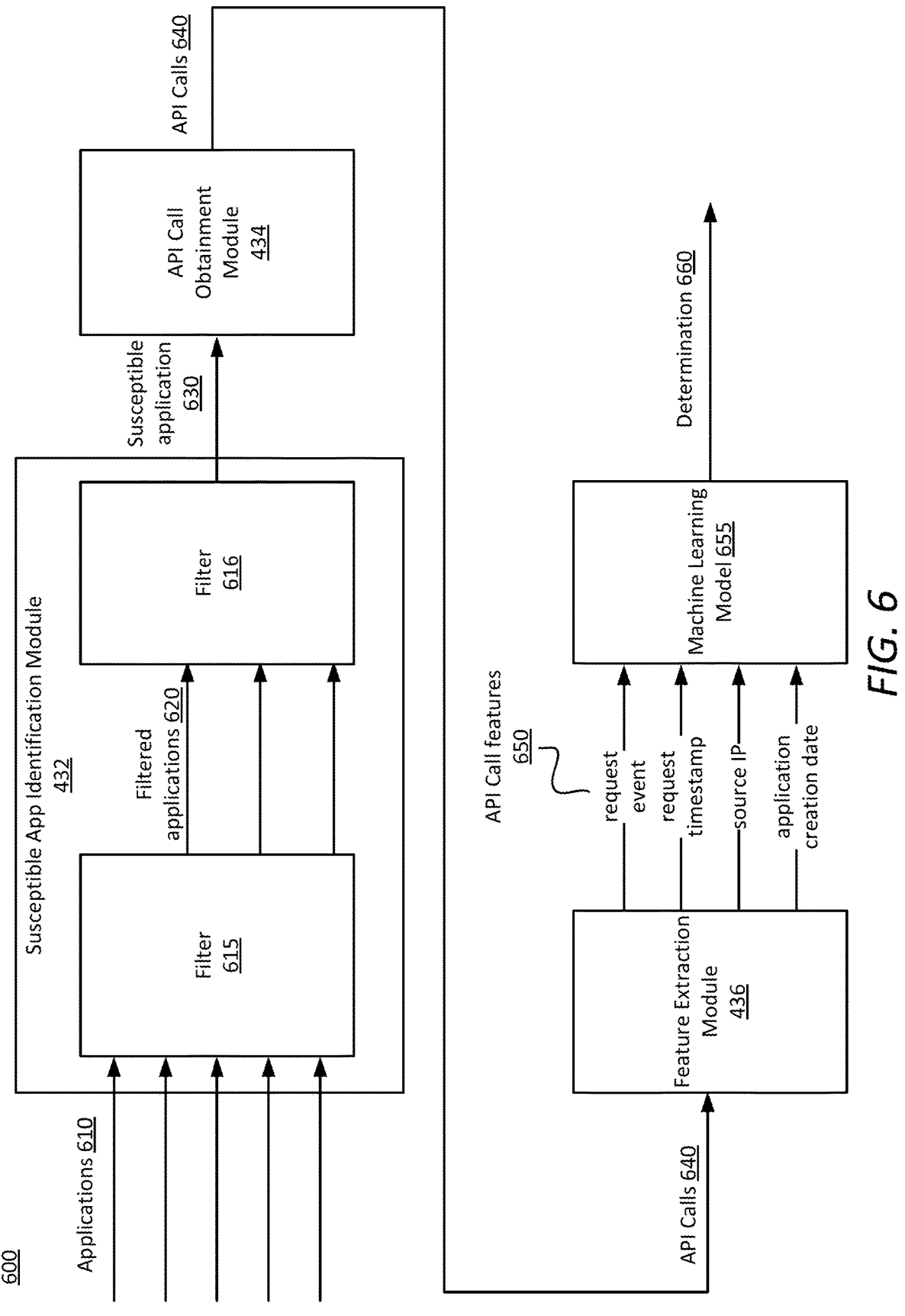
FIG. 6 shows details of an example attack identification process performed by the content management system, according to one example embodiment.

To improve efficiency, susceptible app identification module 432 may further filter applications and identify the susceptible application from the filtered set. In one example, the susceptible app identification module 432 may filter applications to exclude applications on an allow list, a list of applications previously determined to be benign. In another example, the susceptible app identification module 432 may filter applications to include only those with preliminary API call features, such as including only applications that, through API calls, performed a particular pattern of events. For example, a first pattern of events may be uploading a file, downloading the file, and deleting the file within a 60 seconds and a second pattern of events may be uploading a file from a first IP address and downloading the file from a second IP geographically separated from the first IP address within 60 seconds. In some embodiments, the susceptible app identification module 432 may filter applications to include only applications that performed at least one of the two example patterns. The susceptible app identification module 432 may filter the applications in any order. For example, the susceptible app identification module 432 may first filter for applications in the development state and then further filter the development state applications for applications that performed a sequence of events. Or the susceptible app identification module 432 may first filter for applications that performed a sequence of events and then further filter the applications that performed a sequence of events for applications in the development state. An example filtering process is illustrated in FIG. 6.

The API call obtainment module 434 may obtain a set of API calls made by the susceptible application (e.g., client application 200). The API call obtainment module 434 may obtain the set of API calls from API call log 324. In some embodiments, the API call obtainment module 434 may obtain a set of API calls that fit varying constraints. For example, the API call obtainment module 434 may obtain a set of API calls that occurred within a time range (e.g., one day, one hour).

The feature extraction module 436 may extract a vector of API call features from the set of API calls made by the susceptible application. The feature extraction module 436 may extract API call features from any of the information relevant to the API call or stored in API call log 324. Example API call features may include API requests for events associated with content items, such as API requests to create, modify, access, delete, move, copy, share, upload, or download of content items. An API request to modify content items may be a request to modify the content itself or a request to modify metadata associated with the content (e.g., file type, file name, file author). API call features may include other information relevant to the API requests, such as timestamps of requests (e.g., timestamp of an API request to download a file), frequency of requests, predetermined sequences of requests (e.g., an API request to create a file followed by an API request to modify a file), or the success of the request, which the feature extraction module 436 may determine from the API request status code, response payload, response time, error log, or debug log. The feature extraction module 436 may also extract API call features that pertain to users of the application, such as a user's IP address, obtained from the source IP address of the API call. In some embodiments, the feature extraction module 436 may extract API call features from the content items interacted with through the set of API calls. For example, the feature extraction module 436 may extract API call features from interactions with particular content item structures (e.g., file structure, folder structure) or interactions with content items of particular sizes (e.g., file size, folder size), types (e.g., jpeg, pdf, doc, txt), names, or other content item metadata. In further embodiments, the feature extraction module 436 may extract API call features from information that cannot be extracted from the API calls alone. For example, the feature extraction module 436 may extract a API call feature pertaining to when the susceptible application was created.

The model training module 438 may train one or more machine learning models. The model training module 438 may train a machine learning model to receive, as input, API call features from a set of API calls made by the susceptible application and to output a probability that the set of API calls represents or includes a representation of a C2 attack. In some embodiments, the model training module 438 may train the machine learning model to output a determination of whether the set of API calls represents a C2 attack. For example, if the probability that the set of API calls represents a C2 attack exceeds a threshold value, the machine learning model may output a determination that the set of API calls represents a C2 attack. In another embodiment, the machine learning model may be a classifier trained to produce a binary output, indicating that the API call features either do or do not represent a C2 attack.

Training data for the models may include API call features for sets of API calls. Each set of API calls may contain API calls from an individual application (e.g., client application 200) and any accounts or IP addresses associated with the application. The model training module 438 may obtain training data from the API call log 324 of the content management system 100 and extract API call features using the feature extraction module 436. As the API call log 324 is internal to the content management system 100 (or may be implemented on the collaborative content management system 130), the data in the API call log 324 is not accessible to external systems. As such, the model training module 438, being a part of the collaborative content management system 130, is uniquely situated to access the data in the log and use it for model training. In some embodiments, the model training module 438 may filter the data in the API call log 324 to use in different training sets. For example, the model training module 438 may train a model on only API calls made by a particular application.

The model training module 438 may label the sets of API calls in the training data by whether each set represents or includes a representation of a C2 attack. In some embodiments, the model training module 438 may receive manual labels. For example, after an administrator recognizes a C2 attack, the model training module 438 may receive, from the administrator, labels indicating that a particular set of API calls were involved in a C2 attack. The model training module 438 may, in some embodiments, label the sets of API calls with varying degrees of certainty that the API calls represent an attack. For example, if an administrator is uncertain that a set of calls was involved in a C2 attack yet is unable to confirm the calls as benign, the model training module 438 may receive a label that the set of API calls might represent a C2 attack.

The settings and security module 416 can manage security during interactions between client devices 120, the content management system 100, and the collaborative content management system 130. Additionally, the settings and security module 416 can manage security during interactions between modules of the collaborative content management system. For example, when a client device 120 attempts to interact within any module of the collaborative content management system 130, the settings and security module 416 can manage the interaction by limiting or disallowing the interaction. Similarly, the settings and security module 416 can limit or disallow interactions between modules of the collaborative content management system 130. Generally, the settings and security module 416 accesses metadata associated with the modules, systems 100 and 130, devices 120, user accounts, and collaborative content items to determine the security actions to take. Security actions can include requiring authentication of client devices 120 and user accounts, requiring passwords for content items, removing metadata from collaborative content items, preventing collaborative content items from being edited, revised, saved, or copied, or any other security similar security action. Additionally, settings and security module can access, add, edit, or delete any type of metadata associated with any element of content management system 100, collaborative content management system 130, client devices 120, or collaborative content items.

The settings and security module 416 may take security actions to prevent C2 attacks. For example, responsive to determining that C2 attacks are coming from the susceptible application, the settings and security module 416 may disable the application, add the application to a deny list of applications, or report the application to a third-party. The security action module 440 may store, in a deny list, IP addresses associated with any client devices that used the susceptible application to make API calls. The settings and security module 416 may consult the deny list to identify future C2 attacks more quickly. Responsive to determining that C2 attacks are not coming from the susceptible application, the settings and security module 416 may add the susceptible application to an allow list. Further details of a method for identifying C2 attacks from API calls are described in FIG. 5.

Content management system 100 and collaborative content management system 130 may be implemented using a single computer, or a network of computers, including cloud-based computer implementations. The operations of content management system 100 and collaborative content management system 130 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, collaborative content items servers, failover servers, network management tools and so forth are not shown so as not to obscure the features of the system. The functions and operations of content management system 100 and collaborative content management system 130 are sufficiently complex as to require implementation on a computer system and cannot be performed in the human mind simply by mental steps. Command and control (C2) attacks are used herein as a representative example of attacks that the disclosed systems and methods identify, however other attacks apply wherever C2 attacks are mentioned.

Attack Identification Method

Figure 5:
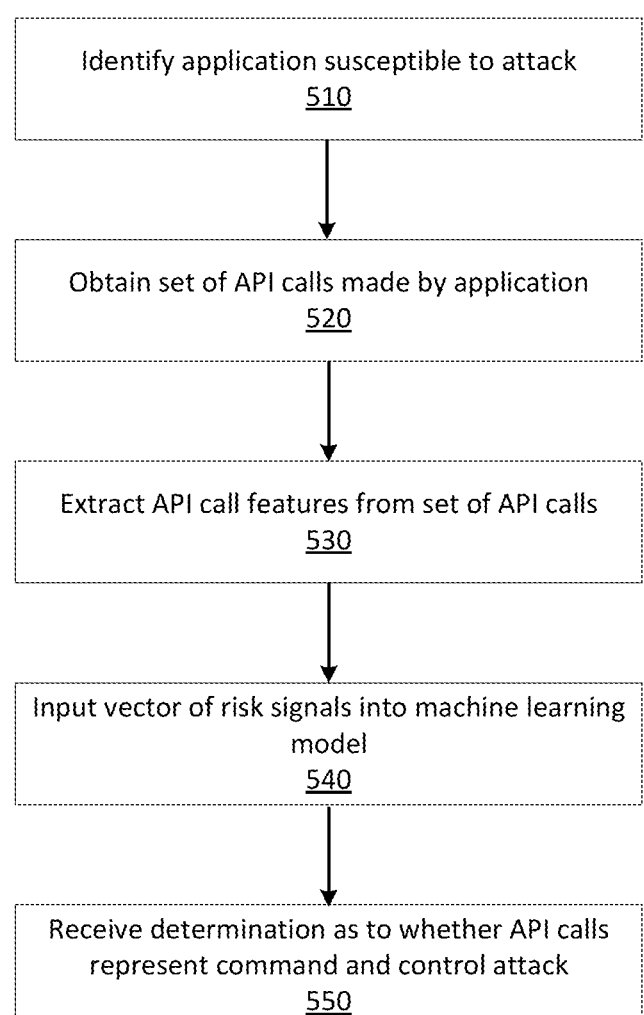
FIG. 5 shows a flowchart of a method of identifying malware C2 using API calls, according to one example embodiment.

FIG. 5 shows a flowchart of an exemplary process for identifying C2 attacks using API calls. Process 500 begins with the collaborative content management system 130 identifying 510 an application installed on one or more client devices that is susceptible to attack by using API calls of the application (e.g., using the susceptible app identification module 432). The collaborative content management system may identify the susceptible application from a set of applications known to have access to or use the API, from a set of applications not on an allow list, or from a set of applications in a development state.

The collaborative content management system 130 obtains 520 a set of API calls made by the identified susceptible application (e.g., using the API call obtainment module 434). The set of API calls may be stored in API call log 324 and may be a subset of API calls made by the application, for example API calls made in the last hour.

The collaborative content management system 130 extracts 530 a vector of API call features derived from the set of API calls made by the susceptible application (e.g., using the feature extraction module 436). API call features include API requests for events associated with content items or other information relevant to API requests such as the content item interacted with, the source IP of the address, etc.

The collaborative content management system 130 inputs 540 the vector of API call features into a machine learning model and receives 550, as output from the machine learning model, a determination as to whether the set of API calls represent a C2 attack. The collaborative content management system 130 may have trained the machine learning model using training data comprising sets of API calls labelled by whether they represent a C2 attack (e.g., using the model training module 438). In some embodiments, the collaborative content management system 130 may input the vector of API call features into more than one or a series of machine learning models. For example, the collaborative content management system 130 may input a subset of the vector of API call features into a first machine learning model. Responsive to the first model returning that the set of API calls may represent a C2 attack, the collaborative content management system 130 may then input a second (or the entire) vector of API call features into a second machine learning model.

FIG. 6 shows further details of an example attack identification process performed by the content management system. Example process 600 begins with the content management system 100 inputting applications 610 into the susceptible app identification module 432. As illustrated, the susceptible app identification module may have a series of filters to help identify the susceptible application. In this example, the susceptible app identification module 432 passes the applications through a first filter 615 to produce filtered applications 620. The first filter 615 may filter for applications that performed a pattern of events through the API calls (e.g., uploading, downloading, and deleting a file within a time range). As such, filtered applications 620 include applications that performed the pattern of events. The susceptible app identification module 432 may then pass the filtered applications 620 through a second filter 616, outputting a susceptible application 630. As an example, the second filter 616 may filter for applications in the development state. Thus, the susceptible application 630 is an application that has both performed the sequence of events and is in the development state. The susceptible app identification module 432 may pass the applications through more or less filters than the two filters 615 and 616 shown in the example. The susceptible app identification module 432 may pass the applications through different filters than the two described in the example. The content management system 100 then inputs the susceptible application into the API call obtainment module 434, which outputs API calls 640 made by the susceptible application. The content management system 100 inputs the API calls 640 into the feature extraction module 436, which extracts API call features 650 from the API calls 640. Example API call features include the event involved in the request (e.g., downloading a file), the timestamp of the request, the source IP of the API call, and the application creation date, which may be extracted from information both within the API calls (e.g., source application) and outside the API calls (e.g., account information associated with the application). The content management system 100 inputs the API call features 650 into a machine learning model 655. The machine learning model 655 outputs a determination 660, a determination of whether the API calls 640 from the susceptible application 630 represent a C2 attack. Further details of the machine learning model are referenced in the model training module 438 of FIG. 4.

Communication Via API Calls

FIG. 7 shows an example C2 attack performed using API calls to a content management system. The example C2 attack takes place through a series of interactions between a control device 700, and a compromised device 701, the content management system 100, and the collaborative content management system 130. The control device 700 is a device much like client device 120. A threat actor may log into an account on the control device 700, allowing access to a client application 200. Through the client application 200, the control device 700 may make API calls to the content management system 100. Similarly, the compromised device 701 is a device much like client device 120. Malware may log into an account on the compromised device 701 (e.g., through executing code or instructions), allowing access to the same client application 200 that the control device 700 has access to. Through the client application 200, the compromised device 701 may make API calls to the content management system 100. Though not explicitly shown in the figure, the content management system 100 may log API calls from the control device 700 and the compromised device 701 in the API call log 324. Though only shown once in the figure at step 780, the collaborative content management system 130 may access API calls from the API call log 324 of the content management system 100 at any time.

The example interaction shown in FIG. 7 begins with the compromised device 701 generating 702 an initiation file including an initiation key. The initiation file refers to an initial file that signals to the control device 700 that the compromised device 701 is ready to receive instructions. The initiation key is a value unique to the compromised device 701 on the compromised device 710. The initiation key may include a term indicating the compromised device 701 is ready to receive instructions and may also include a unique identifier of the compromised device 701. For example, the initiation key may be "001:initiate" where the "001" is the unique identifier of the malware and "initiate" signifies that the compromised device 701 is ready to receive instructions from the control device 700. In some attacks, the initiation key may be used as the title of the initiation file. In some attacks, the initiation file may be a folder. The compromised device 701 uploads 705 the initiation file to the content management system 100 through an API request, which the content management system 100 may log in API call log 324.

Meanwhile, the control device 700 may be periodically polling 810 the content management system 100 for the initiation file. The control device 700 may poll 710 for the initiation file through an API request, which, again, the content management system 100 may log in API call log 324. The control device 700 may poll 710 for the presence of a file (e.g., in an empty folder), polling for a new file, or polling for a file with a particular initiation key or signifier (e.g., "initiate"). Responsive to recognizing the initiation file in the content management system 100, the control device 700 may use an API call to extract 715 the initiation key from the initiation file. Examples of extracting include downloading the initiation file or reading the file name of the initiation file. The control device 700 may optionally delete 720 the initiation file by making another API call to the content management system 100. For example, the control device 700 may delete 720 the initiation file in an effort to keep the C2 attack undetected by the content management system 100 or any associated administrators.

The control device 700 generates 725 a task file including a task key. The task file may include a payload containing instructions for the compromised device 701 to execute on the compromised device 710. Instructions may include malicious actions, such as downloading additional malware onto the compromised device 710 or connecting the compromised device 710 to a network of compromised devices (e.g., creating a botnet). The task key may be similar in format to the initiation key. The task key may include the unique identifier of the compromised device 701 and a signifier that the task file contains a task. For example, the task key may be "001:task" and may be either included in the task file itself or used as the title of the task file. The control device uploads 730 the task file to the content management system 100 by making an API call.

After uploading 705 the initiation file, the compromised device 701 polls 735 the content management system 100 for the task file. The compromised device 701 polls 735 for the task file by making API calls to the content management system. The compromised device 701 may poll 735 periodically. Responsive to the control device 700 uploading 730 the task file and the compromised device 701 recognizing the file in the content management system, for example from the task key, the compromised device 701 makes an API call to download 740 the task file. The compromised device 701 reads 745 the content of the task file (e.g., a payload containing malicious instructions), optionally makes an API call to the content management system 100 to delete 750 the task file.

As previously mentioned, the collaborative content management system 130 may access 780 API calls from the API call log 324 of the content management system 100 at any time. For illustrative purposes, the figure shows the collaborative content management system 130 accessing API calls from the content management system 100 after the compromised device 701 deletes 750 the task file. The API calls accessed may include any amount of API calls from either the control device 700 or the compromised device 701. As both the control device 700 and the compromised device 701 made the API calls through the client application 200, the API calls shown represent API calls made by the client application 200. The collaborative content management system 130 may extract 785 API call features from the API calls. The collaborative content management system 130 may determine that the API calls represent a C2 attack. The collaborative content management system 130 may take 795 a security action. In this example, as the security action, the collaborative content management system 130 may communicate to the content management system to block future API calls coming from the client application 200.

Returning to the compromised device 701, the compromised device 701 may execute 755 the task file and may generate 760 a response file including a response key. The response file may include the results of executing the task file content or may include a confirmation that the task file was received. The response key may be like the initiation key or the task key. For example, the response key may be "001:response." The compromised device 701, through an API call, may attempt to upload 765 the response file to the content management system 100. However, the content management system 100 blocks 799 the API call, effectively blocking the compromised device 701 from uploading the response file to the content management system 100.

The control device 700, after uploading 730 the task file, may poll 770 for the response file. The control device 700 may poll 770 periodically. However, the content management system 100 blocks 799 the API call, effectively blocking the control device 700 from polling for the response file. In the case where the content management system 100 did not block the API call (not shown), the control device 700 would, responsive to recognizing the response file (e.g., from the response key), makes an API call to download the response file from the content management system 100.

Additional Considerations

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

In this description, the term "module" refers to a physical computer structure of computational logic for providing the specified functionality. A module can be implemented in hardware, firmware, and/or software. In regards to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. It will be understood that any computer programming language may support equivalent structures using a different terminology than "module."

It will be understood that the named modules described herein represent one embodiment of such modules, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including optical disks, CD-ROMs, read-only memories (ROMs), random access memories (RAMs), magnetic or optical cards, or any type of media suitable for storing electronic instructions, and each coupled to a computer system bus. Furthermore, the computers referred to in the specification may include a single processor or may be architectures employing multiple processor designs for increased computing capability.

The algorithms presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

As used herein, the word "or" refers to any possible permutation of a set of items. Moreover, claim language reciting 'at least one of' an element or another element refers to any possible permutation of the set of elements.

Although this description includes a variety of examples and other information to explain aspects within the scope of the appended claims, no limitation of the claims should be implied based on particular features or arrangements these examples. This disclosure includes specific embodiments and implementations for illustration, but various modifications can be made without deviating from the scope of the embodiments and implementations. For example, functionality can be distributed differently or performed in components other than those identified herein. This disclosure includes the described features as non-exclusive examples of systems components, physical and logical structures, and methods within its scope.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method comprising:
identifying an application installed on one or more client devices by selecting the application from a set of applications, wherein selecting the application comprises filtering the set of applications based on preliminary application protocol interface (API) call features, including the application having a development state that is not approved or verified by a content management system and based on the development state, the application being susceptible to an attack by API calls of the application;
obtaining a set of API calls made by the application;
extracting a vector of API call features derived from the set of API calls;
inputting the vector of API call features into a machine learning model; and
receiving, as output from the machine learning model, a determination as to whether the set of API calls represent a command and control attack.

2. The method of claim 1, wherein identifying the application installed on the one or more client devices that is susceptible to an attack by using API calls of the application comprises identifying the application from a set of development state applications.

3. The method of claim 1, wherein:
identifying the application installed on the one or more client devices that is susceptible to an attack by using API calls of the application comprises filtering the set of applications with preliminary API call features based on respective patterns of events corresponding to the respective applications of the set of applications,
the preliminary API call features comprise the application performing a pattern of events, and
the pattern of events includes a set of events performed in an order within a time range.

4. The method of claim 1, wherein identifying the application installed on the one or more client devices that is susceptible to an attack by using API calls of the application comprises identifying the application from a set of development state applications with preliminary API call features.

5. The method of claim 1, wherein obtaining the set of API calls made by the application comprises obtaining a set of API calls that occurred within a predefined range of time.

6. The method of claim 1, wherein the machine learning model is trained with training data comprising sets of API calls labelled by whether they represent a C2 attack.

7. The method of claim 1, further comprising, responsive to receiving a determination that the set of API calls represents a command and control attack, taking a security action.

8. The method of claim 7, wherein the security action comprises adding the application to a deny list.

9. The method of claim 1, further comprising, responsive to receiving a determination that the set of API calls does not represent a command and control attack, adding the application to an allow list.

10. The method of claim 9, wherein identifying the application comprises identifying the application from a set of applications that excludes applications on the allow list.

11. The method of claim 9, wherein identifying the application comprises identifying the application from a set of applications that excludes applications on the allow list.

12. A non-transitory computer-readable medium comprising memory with instructions encoded thereon, the instructions, when executed by one or more processors, causing the one or more processors to perform operations, the instructions comprising instructions to:
identify an application installed on one or more client devices by selecting the application from a set of applications, wherein selecting the application comprises filtering the set of applications based on preliminary application protocol interface (API) call features, including the application having a development state that is not approved or verified by a content management system and based on the development state, the application being susceptible to an attack by using API calls of the application;
obtain a set of API calls made by the application;
extract a vector of API call features from the set of API calls;
input the vector of API call features into a machine learning model; and
receive, as output from the machine learning model, a determination as to whether the set of API calls represent a command and control attack.

13. The non-transitory computer-readable medium of claim 12, wherein the instructions for identifying the application installed on the one or more client devices that is susceptible to an attack by using API calls of the application comprise instructions to identify the application from a set of development state applications.

14. The non-transitory computer-readable medium of claim 12, wherein:

the instructions for identifying the application installed on the one or more client devices that is susceptible to an attack by using API calls of the application comprise instructions to filter the set of applications with preliminary API call features based on respective patterns of events corresponding to the respective applications of the set of applications, the preliminary API call features comprise the application performing a pattern of events, and the pattern of events includes a set of events performed in an order within a time range.

15. The non-transitory computer-readable medium of claim 12, wherein the instructions for identifying the application installed on the one or more client devices that is susceptible to an attack by using API calls of the application comprise instructions to identify the application from a set of development state applications with preliminary API call features.

16. The non-transitory computer-readable medium of claim 12, wherein the instructions for obtaining the set of API calls made by the application comprise instructions to obtain a set of API calls that occurred within a predefined range of time.

17. The non-transitory computer-readable medium of claim 12, wherein the machine learning model is trained with training data comprising sets of API calls labelled by whether they represent a C2 attack.

18. A system comprising:

memory with instructions encoded thereon; and one or more processors that, when executing the instructions, are caused to perform operations comprising:

identifying an application installed on one or more client devices by selecting the application from a set of applications, wherein selecting the application comprises filtering the set of applications based on preliminary application protocol interface (API) call features, including the application having a development state that is not approved or verified by a content management system and based on the development state, the application being susceptible to an attack by using API calls of the application;

obtaining a set of API calls made by the application;

extracting a vector of API call features derived from the set of API calls;

inputting the vector of API call features into a machine learning model; and receiving, as output from the machine learning model, a determination as to whether the set of API calls represent a command and control attack.

* * * * *